United States Patent [19]

Shimpuku

[11] Patent Number: 4,646,169

[45] Date of Patent: Feb. 24, 1987

[54] MAGNETIC RECORDING DEVICE

[75] Inventor: Yoshihide Shimpuku, Kanagawa, Japan

[73] Assignee: Sony Corporation, Tokyo, Japan

[21] Appl. No.: 838,392

[22] Filed: Mar. 5, 1986

Related U.S. Application Data

[63] Continuation of Ser. No. 591,563, Mar. 20, 1984, abandoned.

[30] Foreign Application Priority Data

Mar. 30, 1983 [JP] Japan ................................... 58-52503

[51] Int. Cl.⁴ .............................................. G11B 5/02
[52] U.S. Cl. .................................................... 360/21
[58] Field of Search ..................................... 360/33, 21

[56] References Cited

U.S. PATENT DOCUMENTS 4,180,833 12/1979 Nishikawa et al. .................... 360/21
4,482,928 11/1984 Moriya et al. .......................... 360/21
4,549,227 10/1985 Hashimoto et al. ................... 360/32

Primary Examiner—Vincent P. Canney
Attorney, Agent, or Firm—Lewis H. Eslinger; Alvin Sinderbrand

[57] ABSTRACT

Described is a magnetic recording device in which digital data are recorded with higher density in such a manner that plural recording tracks are sequentially formed on the magnetic recording medium. In the magnetic recording device, any two adjoining tracks are formed by separate magnetic heads whose azimuth angles are equal to $+\theta$, $-\theta$, with the absolute value of the angle $\theta$ being selected to satisfy the relation $16° \leq \theta \leq 22°$, in a manner so that the crosstalk level between any two neighboring tracks may be reduced without affecting the SN ratio.

3 Claims, 10 Drawing Figures

MAGNETIC RECORDING DEVICE

This is a continuation of application Ser. No. 591,563, filed Mar. 20, 1984, now abandoned.

FIELD OF THE INVENTION

This invention relates to a magnetic recording device and more particularly to such device adapted for recording digital signals with higher density.

BACKGROUND OF THE INVENTION

In recent years, in keeping pace with an increase in the amount of digital data to be recorded or reproduced, such as digital audio or video signals, a strong demand has been raised for elevating the recording density on the magnetic tape or the like magnetic recording medium.

For elevating the data recording density, it is customary to reduce the track width or the track pitch, in addition to using a digital data modulation system of higher efficiency or reducing the recording wavelength. However, when the track pitch is reduced in this manner, a so-called crosstalk or interaction between adjoining tracks is increased, with the result that the SN ratio or the error rate are affected adversely. For reducing the crosstalk level, it is customary to use an azimuth angle $\theta$ of the magnetic gap of the head associated with a given track different from that of the magnetic head associated with an adjoining track, as disclosed for example in the copending U.S. patent application Ser. No. 06/211280 (filing date, Nov. 28, 1980). For smaller azimuth angles $\theta$, the crosstalk level is not decreased as desired and, for larger azimuth angles $\theta$, the effective recording density is lowered and the noise increased.

SUMMARY OF THE INVENTION

It is an object of the present invention to provide an improved magnetic recording device.

It is a further object of the present invention to provide a magnetic recording device capable of reducing crosstalk and noise levels while simultaneously realizing high density recording.

In view of these objects, the present invention is directed to a magnetic recording device in which the digital data are recorded on the magnetic recording medium so that plural recording tracks are sequentially formed on said recording medium in an adjoining relation to one another. The recording device according to the present invention is characterized in that the azimuth angles of the magnetic heads adapted for forming any two adjoining ones of the tracks are selected to be equal to $+\theta$ and $-\theta$ with said angle $\theta$ being selected to satisfy the relation $16° \leq \theta \leq 22°$.

DESCRIPTION OF THE PREFERRED EMBODIMENT

The magnetic recording device according to the present invention is hereafter described by referring to the accompanying drawings.

Figure 1:
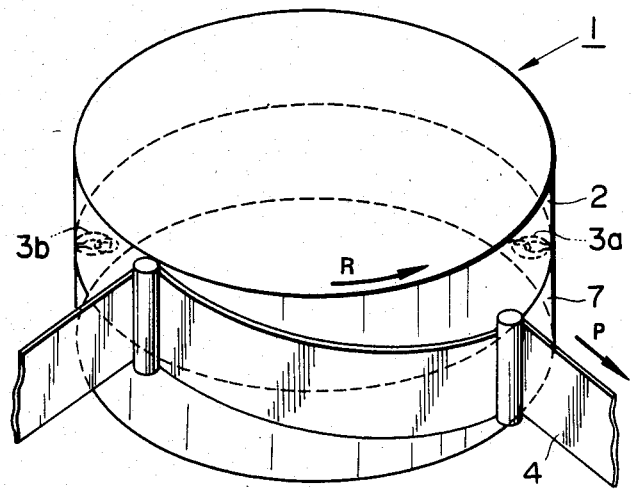
FIG. 1 is a schematic perspective view showing a rotary magnetic head unit employed in an embodiment of the present invention.

In FIG. 1, there is schematically shown a rotary magnetic head unit 1 employed in a rotary head type magnetic recording device of the present invention. In this figure, two magnetic heads 3a, 3b are mounted on a rotary drum 2 at an angular interval of 180° in the direction of rotation of the rotary drum 2 shown by an arrow mark R. A magnetic recording medium or tape 4 is wound helically on the outer periphery of the rotary drum 2 and a stationary drum 7 within an angular extent of approximately 90° and guided to travel in the direction shown by an arrow mark P.

Figure 2:
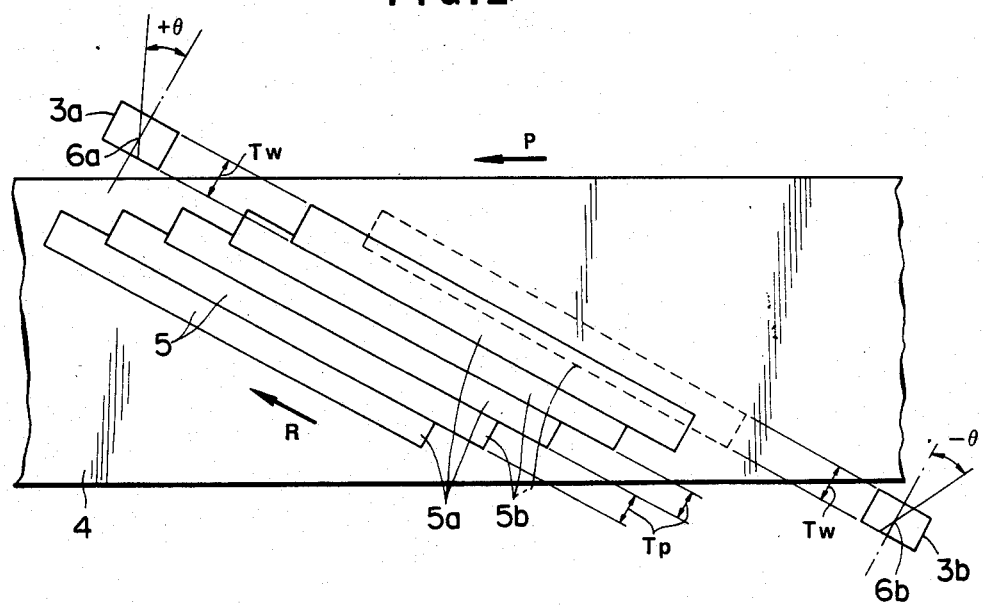
FIG. 2 is a plan view schematically showing the recording pattern on a magnetic tape.

With the aid of the rotary magnetic head device 1, there are recorded on the magnetic tape 4 a plurality of recording tracks 5 inclined relative to the proceeding direction of the tape P, as schematically shown in FIG. 2. In this figure, alternate tracks 5a, 5b are formed and recorded by the magnetic heads 3a, 3b, respectively. These magnetic heads 3a, 3b are so mounted that the magnetic gaps 6a, 6b thereof are inclined by angles $+\theta$, $-\theta$ with respect to the direction of the track width, respectively. Moreover, for achieving higher recording density, not only is the width $T_W$ of the magnetic head 3 (playback track width) selected to be as narrow as possible but the track pitch $T_P$ is selected to be shorter than the width $T_W$ ($T_P < T_W$) so that the lateral edge of a given track is overlapped with the opposite lateral edge of an adjacent track.

According to the current technical level, it is sufficiently possible to reduce $T_W$ to approximately 15 $\mu$m and $T_P$ to approximately 10 $\mu$m. For achieving higher recording density, it is further required to reduce $T_W$ to approximately 10 $\mu$m and $T_P$ to approximately 5 $\mu$m. These values are thought to represent the lowest limits possible for this system of magnetic recording.

The crosstalk level from the adjoining track C is a function of the widths $T_W$, $T_P$, azimuth angle $\theta$ and a recording wavelength $\lambda$, and may be written by an equation $$C(\lambda, \theta, T_P, T_W) = \left| \frac{\sin\left[\frac{2\pi(T_W - T_P)}{\lambda} \tan\theta\right]}{\frac{2\pi T_W \tan\theta}{\lambda}} \right| \quad (1)$$

Figure 3:
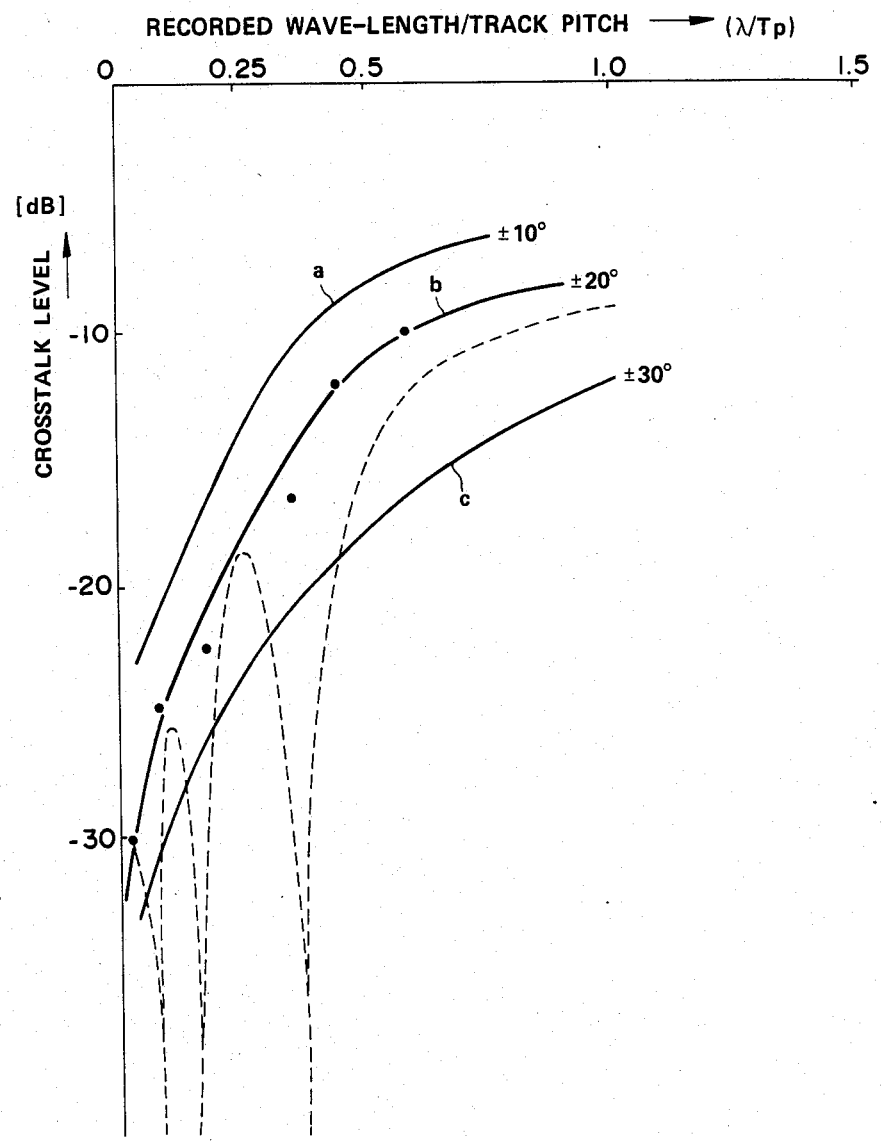
FIG. 3 is a chart wherein the value of the ratio $\lambda/T_P$ is plotted against crosstalk level.

FIG. 3 is a chart showing the crosstalk level against various values of the ratio $\lambda/T_P$, wherein the crosstalk level is shown as decibel values ($=20 \log C$) on the vertical axis. In FIG. 3, the width $T_P$ is selected to be approximately equal to 10 $\mu$m and the width $T_W$ approximately equal to 15 $\mu$m. The crosstalk level is measured with the ratio $\lambda/T_P$ being changed by changing the recording wavelength $\lambda$. In FIG. 3, a, b and c stand for curves corresponding to azimuth angles $\theta$ equal to 10°, 20° and 30°, respectively, it being understood that the azimuth angle for one of two adjoining tracks is $+\theta$ and that for the other is $-\theta$. Dotted line curves in FIG. 3 stand for theoretical values of the crosstalk level C obtained for the azimuth angle $\theta$ in equation (1) equal to 20° C. It will be noted that the curve b for the measured values corresponding to the azimuth angle $\theta$ equal to 20° may be approximated to an envelope for a series of dotted line curves. This may be attributed to the fact that crosstalk from the adjoining two tracks is likely to be detected during actual measurement and that phase deviation exists between the recording wavelengths of the two tracks.

Turning now to the recording wavelength $\lambda$, while it is determined by the frequency of the signals to be recorded, it shows different frequency spectrum depending upon the modulation system, even when the bit rate of the digital data to be recorded remains the same.

Figure 4A:
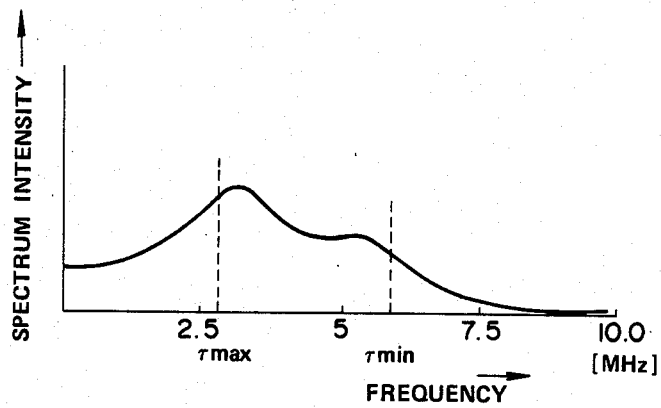
FIGS. 4A, B and C are charts showing frequency spectra of modulated signals modulated in accordance with different modulation systems.
Figure 4B:
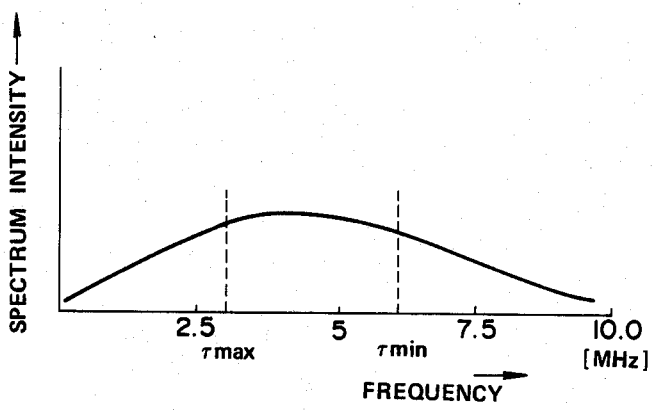
Figure 4C:
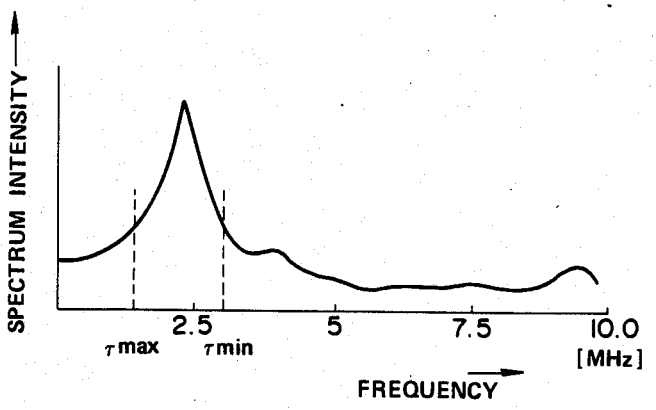

For example, FIGS. 4A, B and C show frequency spectra for $\frac{2}{3}$ conversion, FM and MFM systems, respectively, for the same bit rate of the digital data equal to 6 MBPS. It will be noted from FIG. 4 that, while the actual recording signals are extended over a wider range of frequency spectrum, there exists a peak value of distribution between the maximum $\tau$max (corresponding to $\lambda$max) and the minimum $\tau$min (corresponding to $\lambda$min) of the period $\tau$. It is now supposed that the spectrum of the crosstalk components is approximately equal to that of the above recording signals. Then, should the crosstalk components in the neighborhood of $\tau$max ($\lambda$max) be reduced to a level lower in intensity than the main signal by 20 dB or more, a sufficient SN ratio may be obtained in the range from $\tau$max to $\tau$min which is most required for PCM recording. From FIG. 3, the range of $\lambda/T_P$ satisfying such condition is given by $$\lambda\text{min}/T_p < \lambda/T_p < \lambda\text{max}/T_p \qquad (2)$$
$$0.05 < \lambda/T_p < 0.2$$

It is therefor most desirable to set the azimuth angle $\theta$ under such condition that the dB indication of the equation (1) is less than $-20$ dB and the ratio $\lambda\text{max}/T_P$ is less than 0.2.

It will be noted that, when the audio signals are recorded in the digital form with the aid of the device shown in FIG. 1, the bit rate of the recording data is approximately 6 MBPS. For reducing the ratio of the recording wavelength $\lambda$ to the track pitch $T_P(\lambda/T_P)$ to be lower than 0.2 in the manner described above, the $\frac{2}{3}$ conversion system of FIG. 4A or the FM system of FIG. 4B may preferably be adopted as modulation system although this causes slight reduction in the recording efficiency.

Figure 5A:
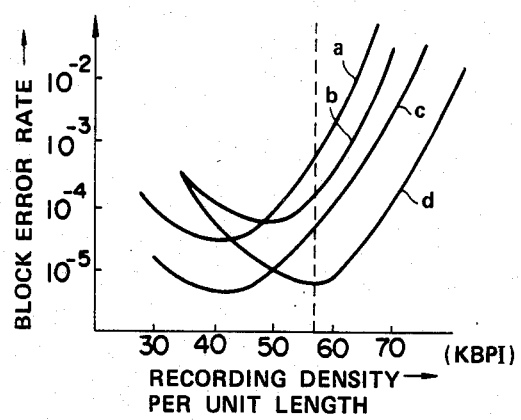
FIGS. 5A, B and C are charts wherein the value of the recording density per unit length is plotted against the block error rate for different azimuth angles.
Figure 5B:
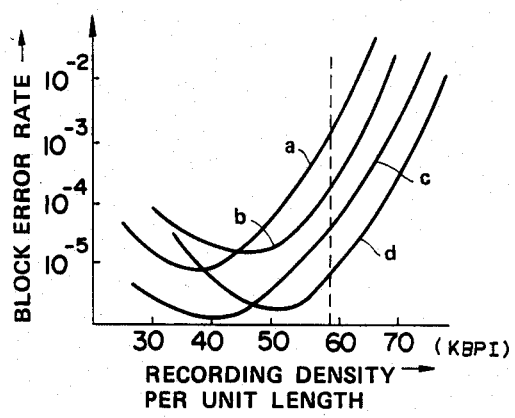
Figure 5C:
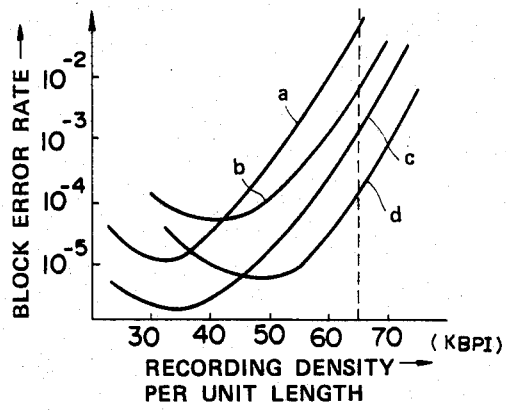

In the graphic charts of FIGS. 5A, B and C, the recording density per unit length (in KBPI) is plotted against the block error rate (1 block=96 bits), where the recording density in KBPI is obtained by recording the signals modulated by the aforementioned $\frac{2}{3}$ conversion system with the aid of the magnetic heads having azimuth angles of 10°, 20° and 30°. In these charts, curves a, b, c and d are obtained by using recording conditions shown in Table 1 below.

TABLE 1

| Curves | Track Pitch Tp | Recording Medium |
|---|---|---|
| a | 10 μm | Metallic tape |
| b | 5 μm | Metallic tape |
| c | 10 μm | Metallized tape |

TABLE 1-continued

| Curves | Track Pitch Tp | Recording Medium |
|---|---|---|
| d | 5 μm | Metallized tape |

It should be noted that the azimuth loss has been neglected in plotting the recording density on the horizontal axis of the charts in FIGS. 5A, B and C and, since the effective recording density is decreased in proportion to cos $\theta$, the recording density per unit length corresponding for example to about 55 KBPI of the effective recording density may be indicated as shown by dotted lines in FIGS. 5A, B and C.

Figure 6:
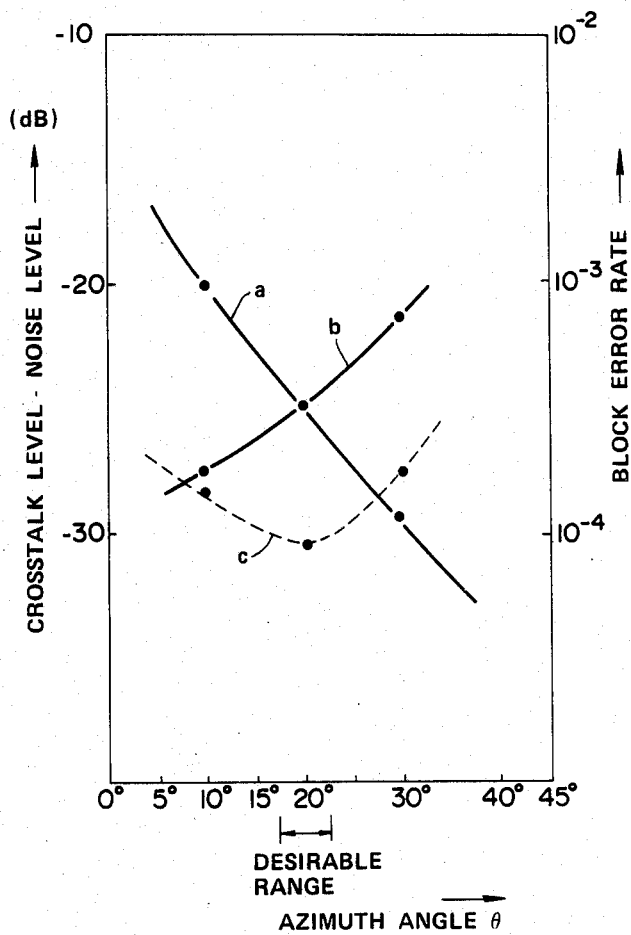
FIG. 6 is a chart wherein crosstalk and noise levels and block error rates are plotted against azimuth angles.

The graphic chart of FIG. 6 shows the optimum azimuth angle that may be derived from the aforementioned results. In this figure, the crosstalk level, noise level in dB and the block error rate (1 block=96 bits) are plotted on the vertical axis and the azimuth angle $\theta$ is plotted on the horizontal axis. The ratio $\lambda/T_P$ is equal to 0.1.

In this figure, a curve a represents the crosstalk level in dB which is decreased with increase in the azimuth angle, and a curve b represents the noise level in dB caused by deterioration in the effective density per unit length, said noise level increasing with the increase in the azimuth angle $\theta$. Thus the error rate caused by the crosstalk level and the noise, that is, the block error rate shown by curve C, becomes minimum at the azimuth angle of about 20°, the angle range centered about 20° being thus the optimum azimuth angle.

And, for reducing $\lambda/T_P$ to less than 0.2 and the crosstalk level to less than $-20$ dB for the ranges of 5 to 10 $\mu$m for $T_P$ and 10 to 15 $\mu$m for $T_W$, the optimum range for the azimuth angle $\theta$ is given by $$16° \leq \theta \leq 22° \qquad (3)$$

With the azimuth angle $\theta$ less than 16°, the crosstalk level is undesirably increased and, with the azimuth angle $\theta$ larger than 22°, the SN ratio is also undesirably affected by deterioration in the effective recording density (density per unit length).

It is to be noted that the present invention may be applied not only to the recording of digital audio signals, but to the recording of digital video signals or computer digital data, and the mechanical aspect of the recording device is not limited to that shown in the example of FIG. 1.

From the foregoing it is seen that the arrangement according to the present invention provides a magnetic recording device in which the azimuth angles $\theta$ of any two adjoining tracks (with one being $+\theta$ and the other $-\theta$) are selected to be within the range from 16° to 22° whereby the optimum playback conditions of the magnetic recording with a minimum block error rate may be assured for high density recording for the magnetic head width in the range of 10 to 15 $\mu$m and the track pitch in the range of 5 to 10 $\mu$m.

What is claimed is:

1. Apparatus for recording digital data on a magnetic recording medium in a plurality of successive parallel recording tracks formed in adjoining relation to respective neighboring tracks, in which upon reproduction a signal representing the digital data reproduced from one said track is subjected to crosstalk from signals reproduced from tracks adjacent thereto and is further subject to digital errors at a block error rate corresponding to a bit rate of recording of said digital data in said tracks, said apparatus comprising first and second magnetic heads for alternately recording said digital data in successive ones of said tracks and having first and second azimuth angles equal to $+\theta$ and $-\theta$, respectively, where, in order to minimize the combined effect of said crosstalk and said block error rate, angle $\theta$ is selected to satisfy the relation $16° \leqq \theta \leqq 22°$.

2. Apparatus according to claim 1, in which said first and second magnetic heads each have a head width $T_W$, said tracks are formed on the recording medium with a track pitch $T_P$ less than said head width $T_W$ such that side edges of each track overlap opposing side edges of the respective neighboring tracks, and in which the ratio $\lambda/T_P$ is selected to be less than 0.2, where $\lambda$ is a maximum recording wavelength of said apparatus.

3. Apparatus according to claim 2, in which said first and second magnetic heads are rotated to form said tracks inclined relative to a longitudinal direction of said recording medium, and in which said first and second azimuth angles are selected to be equal to $+20°$ and $-20°$, respectively.

* * * * *